United States Patent
Hagspiel et al.

(10) Patent No.: US 9,916,268 B2
(45) Date of Patent: Mar. 13, 2018

(54) DATA TRANSFER USING A DESCRIPTOR

(71) Applicant: INTERNATIONAL BUSINESS MACHINES CORPORATION, Armonk, NY (US)

(72) Inventors: Norbert Hagspiel, Wendlingen (DE); Sascha Junghans, Ammerbuch (DE); Matthias Klein, Boeblingen (DE); Joerg Walter, Tuebingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 172 days.

(21) Appl. No.: 14/551,798

(22) Filed: Nov. 24, 2014

(65) Prior Publication Data
US 2015/0154131 A1    Jun. 4, 2015

(30) Foreign Application Priority Data

Nov. 29, 2013   (GB) .................................. 1321069.5

(51) Int. Cl.
*G06F 13/28* (2006.01)
*G06F 12/084* (2016.01)
*G06F 12/0811* (2016.01)
*G06F 12/0868* (2016.01)
*G06F 12/0871* (2016.01)

(52) U.S. Cl.
CPC ............ *G06F 13/28* (2013.01); *G06F 12/084* (2013.01); *G06F 12/0811* (2013.01); *G06F 12/0868* (2013.01); *G06F 12/0871* (2013.01); *G06F 2212/1024* (2013.01); *G06F 2212/6042* (2013.01)

(58) Field of Classification Search
None
See application file for complete search history.

(56) References Cited

U.S. PATENT DOCUMENTS 6,609,164 B1   8/2003   Kallat
6,845,409 B1   1/2005   Talagala et al.
(Continued)

FOREIGN PATENT DOCUMENTS

WO   WO2010068200 A1   6/2010

OTHER PUBLICATIONS

Handy, The Cache Memory Book, © 1998 Academic Press, p. 89-90.*
Search Report for GB1321069.5 dated May 27, 2014, 3 pages.

*Primary Examiner* — Brian R Peugh
(74) *Attorney, Agent, or Firm* — Margaret McNamara; Matthew M. Hulihan; Heslin Rothenberg Farley & Mesiti P.C.

(57) ABSTRACT

A data processing apparatus includes a number of processor cores, a shared processor cache, a bus unit and a bus controller. The shared processor cache is connected to each of the processor cores and to a main memory. The bus unit is connected to the shared processor cache by a bus controller for transferring data to/from an I/O device. In order to achieve further improvements to the data transfer rate between the processor cache and I/O devices, the bus controller is configured, in response to receiving a descriptor from a processor core, to perform a direct memory access to the shared processor cache for transferring data according to the descriptor from the shared processor cache to the I/O device via the bus unit.

9 Claims, 2 Drawing Sheets

(56) References Cited

U.S. PATENT DOCUMENTS

| | | | |
|---|---|---|---|
| 7,472,205 B2 * | 12/2008 | Abe | H04L 29/06 |
| | | | 710/22 |
| 7,908,394 B2 | 3/2011 | Ye | |
| 8,230,149 B1 * | 7/2012 | Long | G06F 13/12 |
| | | | 710/305 |
| 8,649,395 B2 | 2/2014 | Olderdissen | |
| 8,874,855 B2 | 10/2014 | Conte | |
| 2006/0075119 A1 | 4/2006 | Hussain et al. | |
| 2006/0212612 A1 | 9/2006 | Takamiya et al. | |
| 2011/0185125 A1 | 7/2011 | Jain et al. | |
| 2014/0317333 A1 * | 10/2014 | Dorst | G06F 13/28 |
| | | | 710/308 |

* cited by examiner

DATA TRANSFER USING A DESCRIPTOR

PRIOR FOREIGN APPLICATION

This application claims priority from United Kingdom patent application number 1321069.5, filed Nov. 29, 2013, which is hereby incorporated herein by reference in its entirety.

BACKGROUND

One or more aspects of the invention relate to a data processing apparatus and method. More particularly, one or more aspects relate to a data processing apparatus and method for performing direct memory access.

To provide for high processing performance, computer system architectures generally include caches. Advanced architectures also provide for direct data transfer from the processor cache to I/O devices. As, in instances, the overall system performance in a computer system may be strongly affected by the rate of data transfer to I/O devices, there is a general need for further improvements in this technical area.

SUMMARY

In one embodiment, a direct memory access includes a data processing apparatus. The data processing apparatus includes a number of processor cores, a shared processor cache, a main memory, a bus unit and a bus controller. The shared processor cache is connected to each of the processor cores and to the main memory. The bus unit is connected to the shared processor cache by a bus controller. The bus unit is configured for transferring of data to/from an I/O device, if present. The bus controller is connected to the shared processor cache and configured, in response to receiving a descriptor from one of the processor cores, to perform a direct memory access to the shared processor cache for transferring data according to the descriptor from the shared processor cache to the I/O device via the bus unit.

BRIEF DESCRIPTION OF THE SEVERAL VIEWS OF THE DRAWINGS

Embodiments are described with reference to the attached drawings, in which.

DETAILED DESCRIPTION

Figure 1:
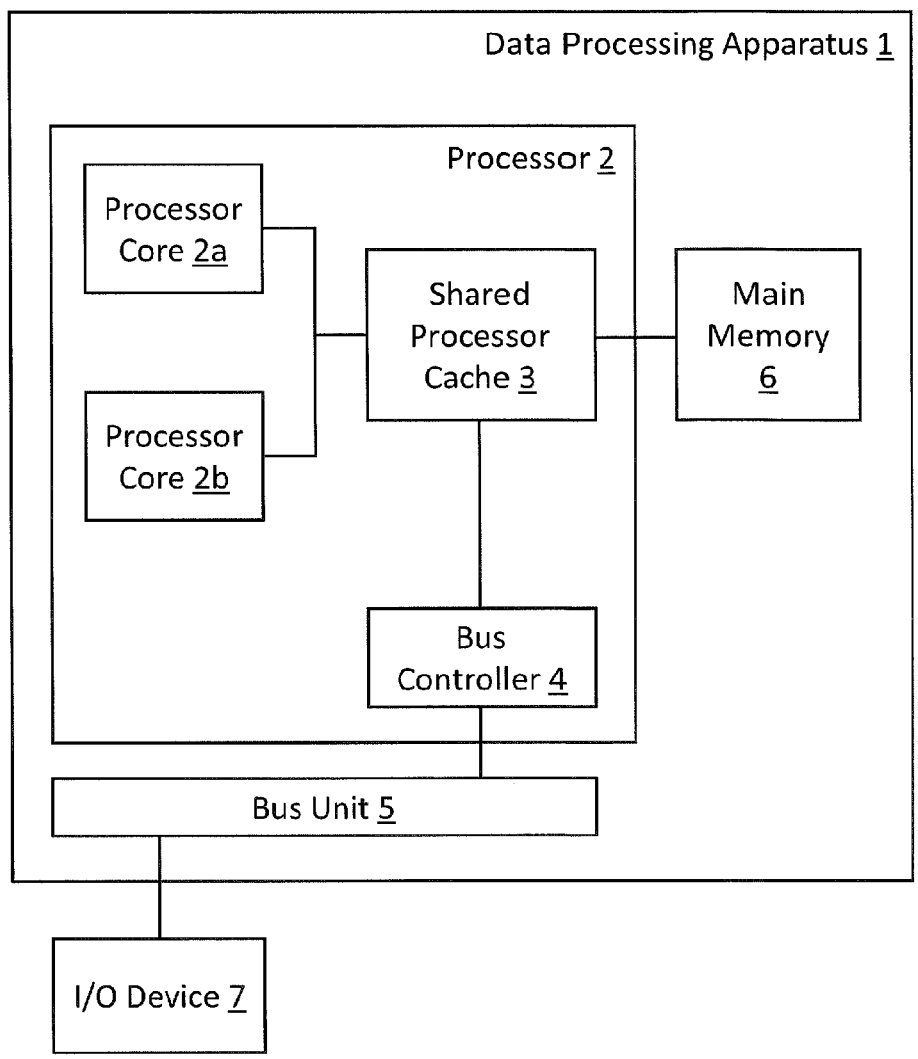
FIG. 1 schematically illustrates a data processing apparatus general architecture in a block chart.

The term "processor", as used herein, shall extend to an electronic device and any portion of an electronic device which is able to execute a computer program or any kind of machine executable instruction. A processor generally comprises a number of processor cores and may include a number of data and/or instruction caches.

The term "shared processor cache", as used herein, shall extend to any hardware configuration providing access to a cache for more than one processor core. In general, the principal purpose of a shared processor cache may be understood as providing a transparent and latency reducing connection between the processor cores and the main memory. In instances, a shared processor cache may additionally serve as a high-bandwidth connection between the processor cores and devices for controlling external ports, busses or adapters. A shared cache may be, for example, an integral or monolithic cache device providing uniform access to a number of processor cores connected thereto. In another exemplary situation, a shared processor cache may be implemented as a network of several integral cache devices. In another exemplary situation, the integral cache devices may be implemented as on-die cache devices located on a processor die. In such situation, each on-die processor cache may be additionally configured to serve as a shared cache for a number of processor cores on the same die. Effectively, there may be a hierarchy of two layers in cache sharing. The lower level on-die cache sharing will typically allow higher bandwidth in data exchange but will be necessarily limited to the processor cores located on the same die. Cache sharing across processor dies will typically yield lower bandwidth in data exchange than the on-die cache sharing. As a further improvement, a separate portion of the main memory may be connected to each on-die processor cache for avoidance of bottlenecks. This approach may be understood as shared memory multi-processor architecture having the memory sharing infrastructure on the level of caches rather than on the (lowest) level of the main memory.

The term "bus unit", as used herein, shall encompass any means configured to transfer data between devices in a computer system. The term "bus" shall not be understood as limitation to a shared bus device. All kinds of point-to-point connections shall be included as well. In instances, the bus unit is used for high-speed data transfer to/from a processor and therefore connects the processor to devices, which may be operated at a high speed of data transfer. In instances, the bus unit is designed to establish connection to fast I/O devices as, for example, network interfaces. In instances, the bus unit may be used to establish connections to other devices as high speed graphics bus or the like. Standardized implementations of a bus unit are commonly known as SCSI, ISA, VESA, PCI, PCIe, Memory Bus and Front-Side-Bus. For this sake, a bus unit may comprise devices to adapt to the communication protocol of the external devices connected thereto as, for example driver units. The term "bus controller", as used herein shall have the meaning of a physical device or a portion of another physical device configured for connecting a bus unit to a processor. A commonly well-known exemplary implementation of a bus controller can be found in the so-called "Northbridge" device in small computer systems. In circumstances, the bus controller is integrated with the processor cores and the processor caches on the same die for better performance.

The term "main memory", as used herein, shall extend to any kind of physical storage device connected to the processor and accessible by means of virtual or physical addressing. This may include but not be limited to RAM, ROM, PROM, EPROM and EEPROM devices. A "main memory" does not necessarily need to be implemented in a single device or with a single point of access. In instances, the term "main memory" may therefore relate to a number of separate portions of working memory whereby each portion has a separate connection to a processor in a multi-processor architecture.

The term "direct memory access", as used herein shall have the generalized meaning of an operational mode suitable for fetching data from any kind of a close-to-processor storage means to an I/O device without continuous involvement of a processor core. The term "close-to-processor storage means" as used before, shall encompass any kind of storage means which is configured to be accessed by a processor via a bus unit by logical or physical addressing. This may include but not be limited to a portion of the processor cache(s) and the main memory. The known prior-art mode of performing direct memory access will be referred to as "conventional direct memory access" for clearer distinction.

The term "I/O device" is intended to extend to any kind of physical device making part of a computer system or being configured to be operated in connection with a computer system for the sake of input/output to/from the computer system. "Input/output" as mentioned before thereby shall have the general meaning of communication between a computer system and the outside world. "Outer world" thereby shall have the meaning of any kind of human or a technical data source or recipient, and therefore also include other computer system or even aggregates thereof as, for example, computer networks. Inputs are the signals or data received by the computer system, and outputs are the signals or data sent from it. I/O devices are therefore used to communicate with a computer system. As I/O devices may be considered, for example, keyboards, monitors, printers, network interfaces (NIC), serial/parallel port devices, external bus connectors, modems, tape drives, disk drives.

Figure 2:
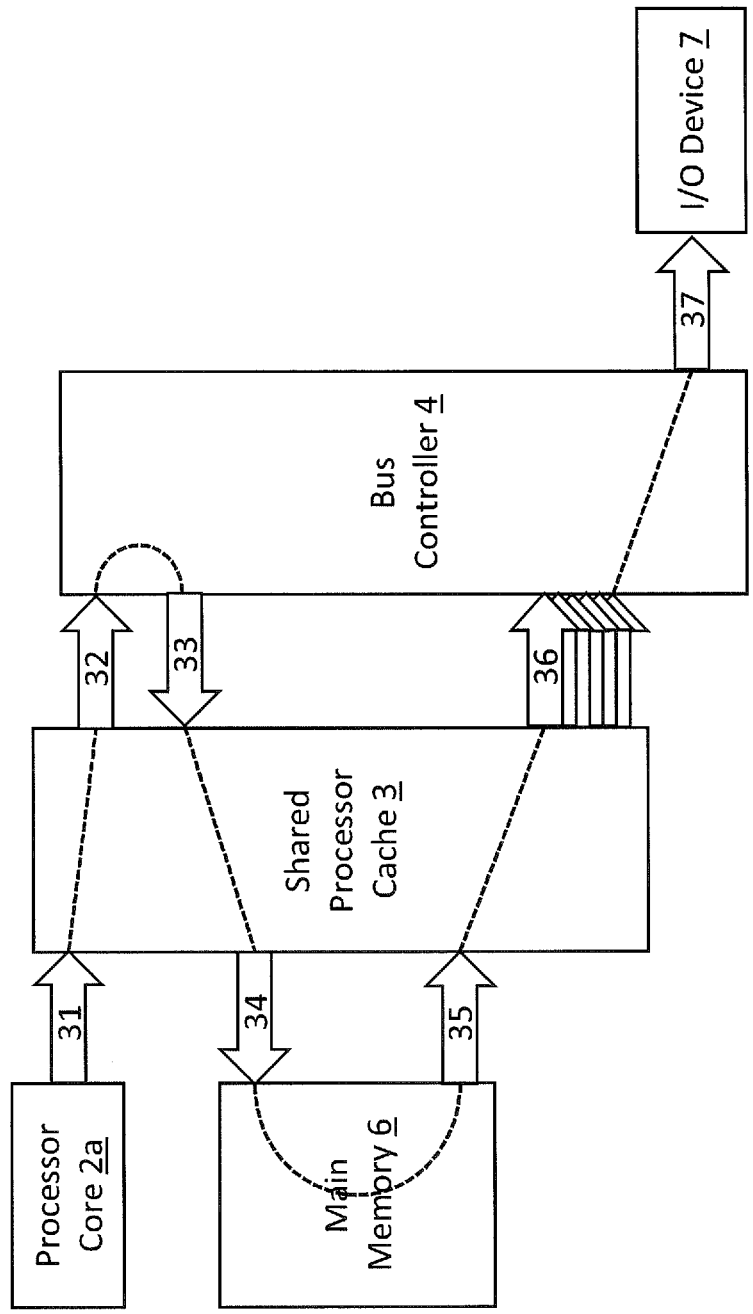
FIG. 2 schematically illustrates a method for direct memory access in a data processing apparatus according to FIG. 1.

On the basis of the following detailed description with reference to FIGS. 1 and 2 it will become apparent, that the generalized direct memory access may be understood as a processor core driven cache transparent direct memory access method. As one difference respective to conventional direct memory access methods, the method as described below is initiated by a processor core and driven by a bus controller rather than initiated and driven by an I/O device as in conventional configurations. Another difference respective to many conventional direct memory access methods can be found in that the pay load data is not transferred besides the (shared) processor cache but rather passed there through. This may result in advantages when pay load data is already available in the (shared) processor cache. It may be considered as an additional advantage of the improved method versus many of the conventional direct memory access methods to allow better/easier availability of processor cache coherency. In numerous conventional direct memory access methods the processor cache has to be flushed before data may be read from memory addresses which have been affected by the conventional direct memory access.

FIG. 1 schematically shows a computer system component block structure. The computer system may, for example, be part of a laptop, desktop, workstation or mainframe computer.

The computer system comprises a data processing apparatus 1 and a separate I/O device 7. The data processing apparatus 1 itself includes a processor 2, a bus controller 4, a bus unit 5 and a main memory 6. The processor 2 comprises a number of processor cores 2a, 2b and a shared processor cache 3. In instances, the shared processor cache 3 may be implemented as an on-die cache device being connected to the processor cores which are located on the same processor die. In an example, each processor core 2a, 2b may additionally include a number of processor core caches. This corresponds to the widely used multi-level cache hierarchies. In another example, the multi-level cache hierarchy may include at least three levels. According to the terms and conventions in the technical field, the level of the caches increases along with the lookup procedure performed thereon. Initially, data lookup is performed in the first level cache. If this lookup failed, the next one will be made in the second level cache and so on. In the literature, the highest level cache often is referred to as the last level cache (LLC). If the lookup performed on the last level cache fails, the respective data has to be loaded from the main memory. When read in reverse, this may be used as a definition of the last level in a multi-level cache hierarchy.

For the sake of clearness and understandability, there is only shown a one-level cache hierarchy in the exemplary drawings. Further, it is assumed that the one-level cache hierarchy is implemented by means of an on-die cache device which is located on the same die as the processor cores 2a, 2b. Further, the single on-die cache device may be symmetrically connected to each of the processor cores 2a, 2b for being operable as a shared processor cache 3. Thereby, sharing of the cache 3 is enabled between the two exemplary processor cores 2a, 2b. In instances, both processor cores 2a, 2b may read and/or write data from/to the shared processor cache 3. In an example, the shared processor cache 3 may be shared entirely. Then, all data in the shared processor cache 3 can be manipulated by both processor cores 2a, 2b in the same way. This may be advantageous in applications when bandwidth in data exchange between the processor cores 2a, 2b is a critical point. In another example, the shared processor cache 3 may be partially shared only. Then, each processor core 2a, 2b will have a small portion of the space in the shared processor cache 3 exclusively assigned thereto. Shared operation is only provided on the remainder of the space in the shared processor cache 3. This may be advantageous in applications, when the operations performed by the processor cores 2a, 2b have very different requirements with regard to memory access bandwidth. If, for example, one processor core performs operations on a small amount of data there will occur a heavy degradation in performance when another processor core extensively accesses the physical address space in the main memory. This degradation will result from the deletion of existing cache lines in order to recover space for newly accessed physical addresses.

In instances, the shared processor cache 3 may be configured to allow forwarding of data written thereto by a processor core 2a, 2b to the bus controller 4. In a more detailed example, the shared cache 3 may forward a predefined portion of written data as the result of a write operation performed by a processor core 2a, 2b. In general, the shared processor cache may be configured to provide a connection between the processor cores 2a, 2b and the bus controller 4. This will allow data forwarding via the shared cache 3 to a device connected to the bus unit 5. Further details will be explained below. The target of the data forwarding may be bus controller 4, for example. In yet another typical example, forwarding may depend on a portion of data written to the shared cache 3 by one of the processor cores 2a, 2b. In such circumstances, the data written to the shared cache 3 may be of a descriptor or reference type designating a virtual or physical address range for transfer to the target. This would correspond to a conceptual generalization of conventional direct memory access descriptors.

In a typical example, as shown in FIG. 1, the main memory 6 will be located outside the processor 2. In an alternative example, however, the main memory may be integrated into the processor of the data processing apparatus. In another example, the access to the main memory 6 may be realized by a memory management unit. The memory management unit may be integrated on the same die as the processor. Typically, the memory management unit operates in the physical address space. In widely used examples, the memory management unit's principal function is to maintain cache coherency between the last level cache and the main memory. Cache coherency may be understood as to make the cache transparent relative to processor core read/write operations. In instances, the memory management unit may be configured to transfer data between the last level cache and the main memory. For the sake of simplification, a memory management unit is not shown in the drawings.

In an example, the bus controller 4 may serve to connect the shared processor cache 3 to the bus unit 5. In a more particular example, this connection may be established between the shared processor cache 3 and the bus controller 4 as shown in FIG. 1. In an example, the bus controller 4 may be separate from the processor 2. However, in another situation as shown in FIG. 1, the bus controller 4 may be integrated with the processor 2. In instances, the bus controller 4 may be built on the same die as the processor cores 2a, 2b and the shared processor cache 3.

In instances, the bus controller 4 may be configured to perform fetch operations to an address in the main memory 6 physical address space as part of the direct memory access operation. In a more particular example, the bus controller 4 may be configured to perform the fetch operation by inclusion of the shared processor cache 3 of the processor 2. This may be advantageous to avoid performance degradation due to memory latency in situations when data is available from the shared processor cache 3. Fetch operations based on shared processor cache 3 may be performed on virtual or physical addresses.

FIG. 2 illustrates a method for operating the data processing apparatus according to an embodiment of the direct memory access. The method may be performed on an apparatus as explained before with reference to FIG. 1.

The data flow scheme only shows the data processing apparatus components being involved in the direct memory access operation to be explained. These components have the same reference numerals assigned to as in FIG. 1. It should be noted that time evolution is top down, i.e. the exemplary method steps are performed one after each other starting on the top. In the drawings, arrows are used to symbolize directed data transfer/propagation between components. However, there is no general need for control to be transferred in the same way between these components. In instances, there may be multiple threads of control running on the components.

The component block symbols have dotted lines in the interiors as an indication of data passing through, data dependency and/or causality of data input/output. The dotted lines, however, make no indication towards the details of data propagation through the respective component. In particular, the dotted lines should not be interpreted towards an unchanged data pass-through (forwarding). The dotted lines may also extend to situations when data is processed into another format or another representation by the component it passes through.

For the sake of simplification and without any restriction, it is assumed that the direct memory access is initiated by the processor core 2a. Obviously, due to the symmetric design of the data processing apparatus 1 respective to the processor cores 2a, 2b and their respective connections to the shared processor cache 3, the transfer could be initiated by the processor core 2b in the same way. Moreover, for a complete understanding of the benefits resulting from the method, the data to be transferred to the I/O device 7 is assumed not being available from the shared processor cache 3 but rather needs to be fetched from the main memory 6.

In an example of the direct memory access method, the processor core 2a starts the data transfer by writing a descriptor to the shared processor cache 3 in a first step 31. In an example, this descriptor may be a command code together with control data. In a further example, the command code may be a machine instruction word and the control data may be a separate 8B (bytes) of data. In just another example, the 8B control data may be incorporated into the machine instruction word as, for example, address offset values are incorporated into the instruction word in indexed load/store operations on a so-called load/store processor architecture.

In an example, the descriptor may be forwarded from the shared processor cache 3 to the bus controller 4 in a subsequent step 32. In a more particular example, the descriptor may be passed through the shared processor cache 3 unchanged to the bus controller 4. In an example, the descriptor data forwarding may be carried out by a push-like operational mode of the shared cache 3. Alternatively, the forwarding may be based on a poll-like performed by the bus controller 4.

When the bus controller 4 receives the descriptor, it causes, in another step 33, the shared processor cache 3 to be filled with the pay load data to be transferred to the I/O device. In an example, the pay load data may be fetched from the main memory 6 if not already available in the shared processor cache 3. In another example, this pay load data fetching step may use similar hardware components and functional modules as a data load of the processor core 2a "through" the transparent shared processor cache 3 in course of a data processing operation. In a more detailed example, in two steps 34, 35 an entire cache line may be transferred from the main memory 6 into the shared processor cache 3.

In instances, the pay load data may be stored in a main memory coherent portion of the shared cache 3. Alternatively, the pay load data may be alternatively stored in an address-less (non-main memory coherent) portion of the shared processor cache 3. In this situation, data constituting part of the pay load data may be extracted from the main memory 6 coherent portion of the shared processor cache 3 and placed into the address-less portion thereof. In a more detailed example, the data may be stored in a predefined (blocked) format as, for example, in an array of 16×16B. This may be advantageous as the bus controller 4 would be able to fetch pay load data always from the same portion of the shared processor cache 3. Then, sharing of the processor cache 3 between the processor cores 2a, 2b and the bus controller 4 could be advantageously limited to the address-less portion for the sake of better system performance. Additionally, there would be no dependency between the organization of the pay load data in the shared processor cache 3 and the physical address of the pay load data in the physical address space.

After the pay load data has been made available somewhere in shared processor cache 3 in the required format, the pay load data is transferred to the bus unit 5 by operation of the bus controller 4 in a subsequent step 36. In instances, this data transfer may be performed directly by the bus controller 4. In a more detailed example, the transfer may be made in a similar way as commonly known from conventional direct memory access fetch operations. If, as explained before, the pay load data has been organized in the address-less portion of the shared processor cache 3 in a predefined format, the transfer may rely on that format and may, in the specific example, be executed in blocks of 16B.

When the pay load data has been made available to the bus controller 4, it may be sent down to an I/O device 7 via the bus unit 5 in a final step 37.

It is apparent, that the direct memory access method as described before may be subject to limitations due to the size of the shared processor cache therein. In these cases, the method may be carried out multiple times for transferring larger amount of data.

The foregoing description of embodiments has been presented for purposes of illustration and description. It is not intended to be exhaustive or to limit embodiments of the present invention to the precise form disclosed. Modifications and variations are possible in light of the above teachings or may be acquired from practice of various embodiments. The embodiments discussed herein were chosen and described in order to explain the principles and the nature of various embodiments and its practical application to enable one skilled in the art to utilize the aspects of the present invention in various embodiments and with various modifications as are suited to the particular use contemplated. The features of the embodiments described herein may be combined in all possible combinations without leaving the scope of the underlying principle ideas.

As described herein, in one embodiment, a direct memory access includes a data processing apparatus. The data processing apparatus includes a number of processor cores, a shared processor cache, a main memory, a bus unit and a bus controller. The shared processor cache is connected to each of the processor cores and to the main memory. The bus unit is connected to the shared processor cache by a bus controller. The bus unit is configured for transferring of data to/from an I/O device, if present. The bus controller is connected to the shared processor cache and configured, in response to receiving a descriptor from one of the processor cores, to perform a direct memory access to the shared processor cache for transferring data according to the descriptor from the shared processor cache to the I/O device via the bus unit.

In an embodiment, the data processing apparatus has the shared processor cache configured for, in response to a write operation of the descriptor by one of the processor cores, forwarding the descriptor to the bus controller.

In an embodiment, the data processing apparatus has a shared processor cache comprising an integral cache device connected to multiple processor cores.

In advancement thereof, the data processing apparatus has a shared processor cache comprising an integral on-die cache device connected to multiple processor cores located on the same processor die.

In another embodiment, the data processing apparatus has a shared processor cache comprising multiple integral cache devices connected together in a network.

In advancement thereof, each of said integral cache devices may be an on-die cache device connected to a number of processor cores located on the same processor die.

In another embodiment, the data processing apparatus has a network of several integral cache devices, a portion thereof being pairwise connected to portions of the main memory.

In an embodiment, the data processing apparatus may have a bus controller being additionally configured for fetching the data according to the descriptor from the main memory into a location within the shared processor cache.

In another embodiment, the data processing apparatus may have a processor core being configured for creating the descriptor.

The aforementioned embodiments may achieve improvement in data transfer rate when transferring data from a processor cache and/or main memory to I/O devices. Moreover, the embodiments may improve the overall system performance by avoiding continuous involvement of a processor core in such data transfer.

In an embodiment, the data processing apparatus may have the bus controller being a PCIe (Peripheral Component Interface Express) bus controller.

In an embodiment, the data processing apparatus may have the bus controller being integrated with processor.

This embodiment may achieve improvement in data transfer rate between the bus controller and the shared processor cache due to higher clock cycle rates.

In an embodiment, the data processing apparatus may include at least two processor cores.

In an embodiment, the data processing apparatus may have a shared processor cache being part of a multi-level cache hierarchy.

In an embodiment, the data processing apparatus may have a shared processor cache being a third level cache in a multi-level cache hierarchy.

In an embodiment, the data processing apparatus may have a shared processor cache being the last level cache in a multi-level cache hierarchy.

In an embodiment, the data processing apparatus may have a shared processor cache operating on physical memory addresses.

In an embodiment, the data processing apparatus may have the processor cores, the shared processor cache and the bus controller formed on a single die.

This embodiment may achieve a higher level of processor integration, smaller processor structures and higher clock cycle rates in processor operation.

In another embodiment, a direct memory access includes a method for operating a data processing apparatus in connection with an I/O device. The data processing apparatus includes a number of processor cores, a shared processor cache, a bus unit, a main memory and a bus controller. The method includes sending a descriptor to the bus controller by one of the processor cores, receiving the descriptor in the bus controller, and transferring data from the shared processor cache to the I/O device by operation of the bus controller according to the descriptor.

This embodiment may improve data transfer rate in a data transfer from memory to I/O devices. Moreover, one embodiment of a data processing apparatus may improve the overall system performance by avoiding involvement of a processor core in such data transfer.

In an embodiment, the descriptor is written to the shared cache by the processor core and forwarded to the bus controller by the shared cache.

In an embodiment, the descriptor is created by the processor core.

In another embodiment, after receiving the descriptor, the bus controller drives the shared processor cache to fetch data from the main memory.

In another embodiment, a direct memory access includes a computer readable non-transitory storage medium comprising computer readable instructions to be executed by a processor core of a data processing apparatus, further comprising a shared processor cache, a bus unit, a main memory and a bus controller. The execution will cause the data processing apparatus in connection with an I/O device to write a descriptor to the shared processor cache by one of the processor cores, to forward the descriptor to the bus controller, to receive the descriptor in the bus controller, and to transfer data from the shared processor cache to the I/O device by operation of the bus controller according to the descriptor.

The above-described computer system architecture, data processing apparatus and operation methods may be implemented in digital electronic circuitry, in computer hardware, firmware, and/or software. The implementation may, for example, be a programmable processor, a computer, and/or multiple computers.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of aspects of the invention and the practical application, and to enable others of ordinary skill in the art to understand the aspects of the invention for various embodiments with various modifications as are suited to the particular use contemplated.

What is claimed is:

1. A method of operating a data processing apparatus in connection with an I/O device, the method comprising:
   receiving by a bus controller of the data processing apparatus a descriptor sent to said bus controller by a processor core of the data processing apparatus;
   transferring by the bus controller, operating according to said descriptor, data from a shared processor cache coupled to said bus controller to said I/O device
   writing the descriptor to the shared processor cache by the processor core; and
   forwarding the descriptor to the bus controller by the shared processor cache.

2. The method according to claim 1, further comprising creating the descriptor by the processor core.

3. The method according to claim 1, further comprising based on receiving the descriptor, driven by the bus controller, the said shared processor cache to fetch the data from a main memory coupled to the shared processor cache.

4. The method according to claim 1, wherein said shared processor cache comprises multiple integral cache devices connected together in a network, each of said integral cache devices being connected to one or more processor cores.

5. The method according to claim 1, wherein said shared processor cache is part of a multi-level cache hierarchy.

6. The method of claim 1, wherein the data processing apparatus comprises a processor, the processor comprising the processor core, the shared processor cache, and the bus controller.

7. A computer program product comprising:
   a computer readable storage medium readable by a processing circuit and storing instructions for execution by the processing circuit for performing a method comprising:
      receiving by a bus controller of a data processing apparatus a descriptor sent to said bus controller by a processor core of the data processing apparatus;
      transferring by the bus controller, operating according to said descriptor, data from a shared processor cache coupled to said bus controller to an I/O device;
      writing the descriptor to the shared processor cache by the processor core; and
      forwarding the descriptor to the bus controller by the shared processor cache.

8. The computer program product according to claim 7, wherein the method further comprises creating the descriptor by the processor core.

9. The computer program product according to claim 7, wherein the method further comprises based on receiving the descriptor, driven by the bus controller, the said shared processor cache to fetch the data from a main memory coupled to the shared processor cache.

* * * * *